(No Model.) 3 Sheets—Sheet 1.
T. MADER.
MECHANICAL CALCULATOR.
No. 469,579. Patented Feb. 23, 1892.
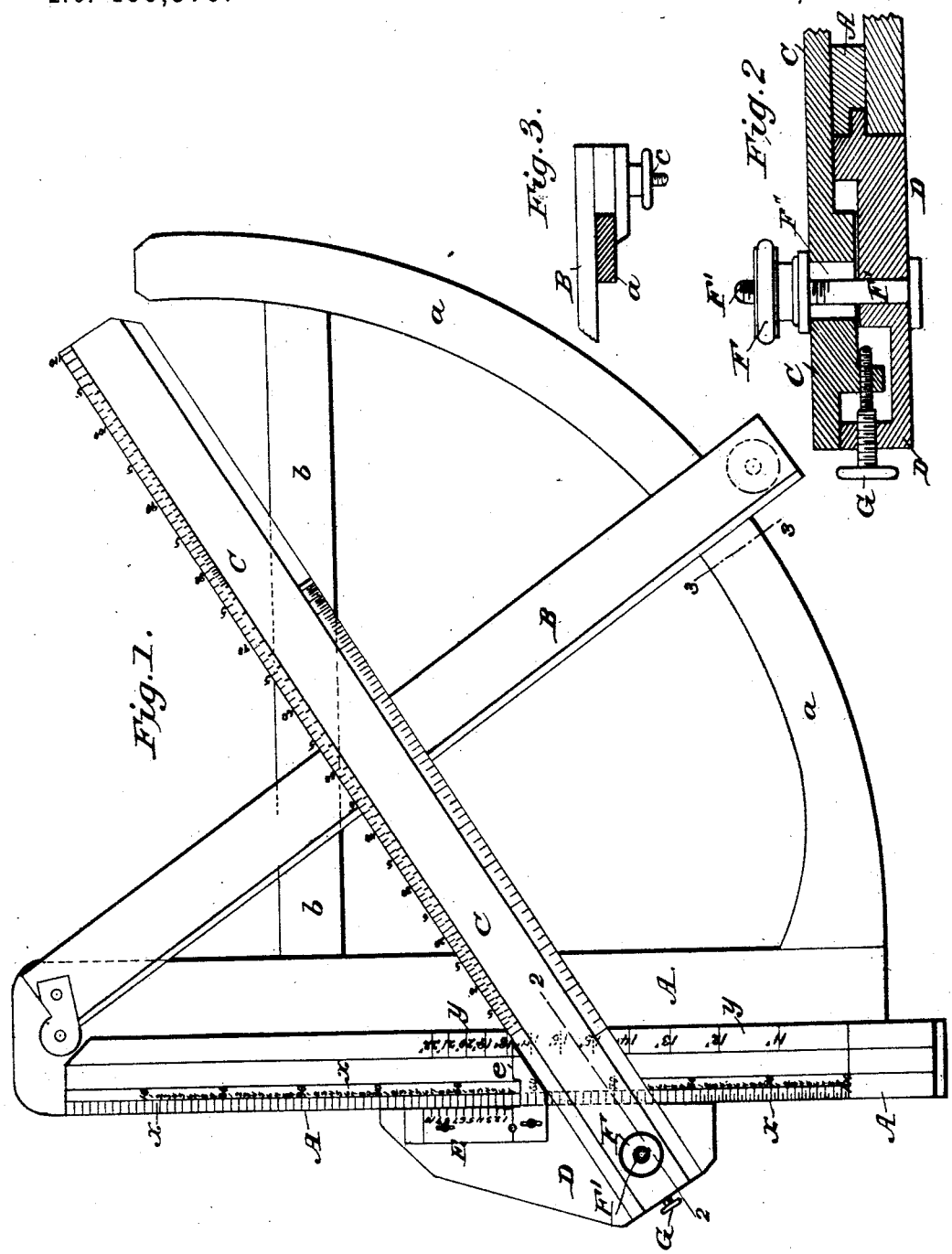
WITNESSES:
Fred G. Dieterich
Amos W. Hart
INVENTOR:
Theodore Mader
BY Munn & Co.
ATTORNEYS (No Model.) 3 Sheets—Sheet 2.
T. MADER.
MECHANICAL CALCULATOR.
No. 469,579. Patented Feb. 23, 1892.
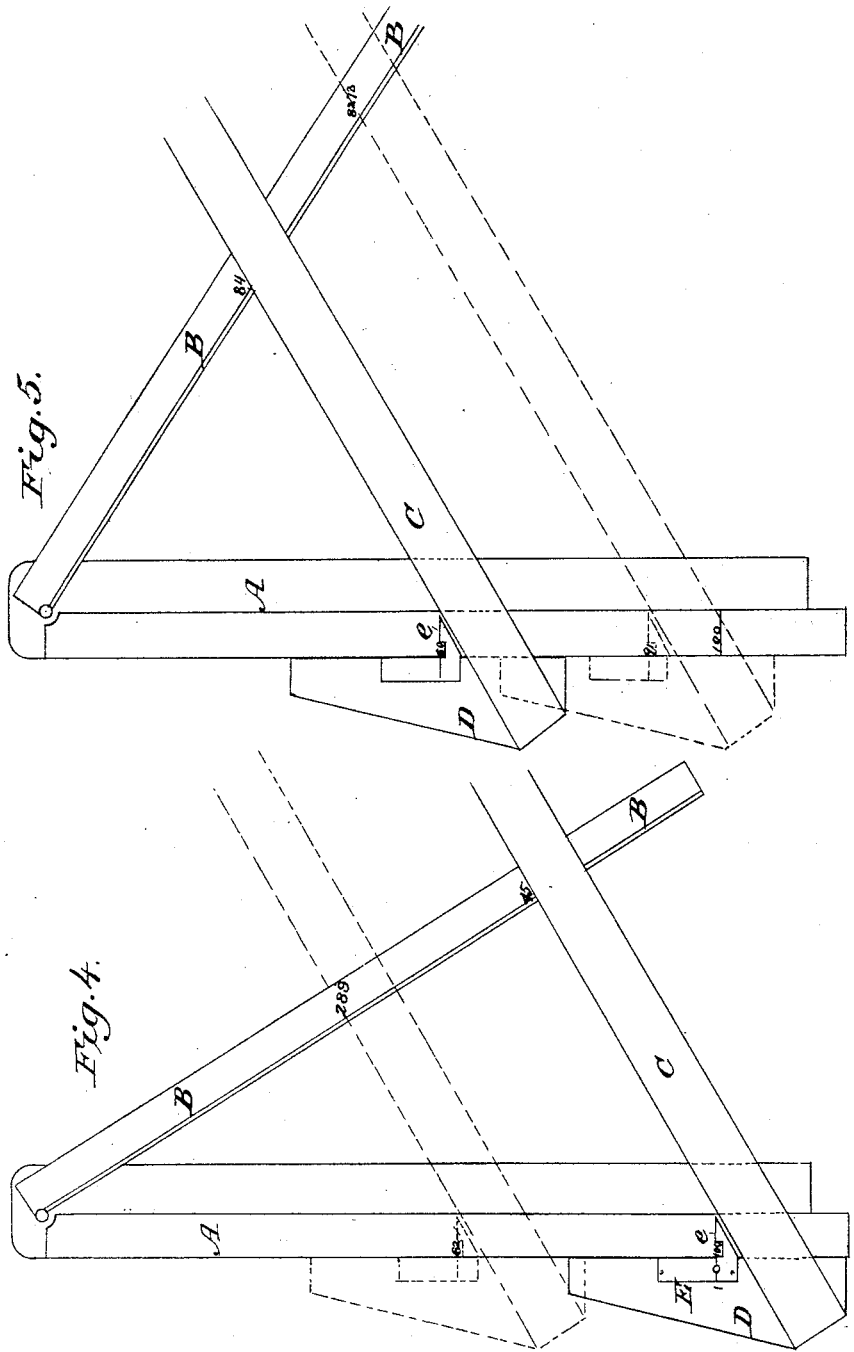

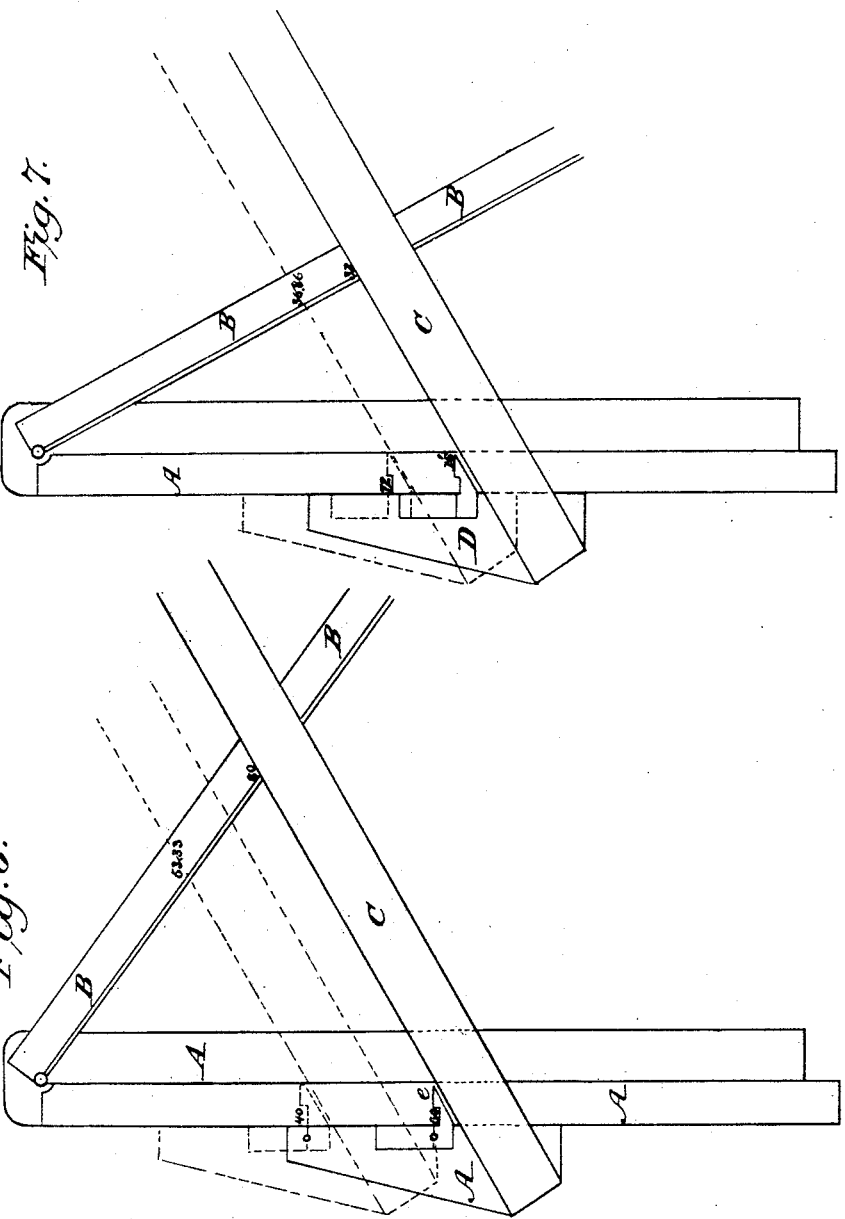

UNITED STATES PATENT OFFICE.

THEODORE MADER, OF CORPUS CHRISTI, TEXAS.

MECHANICAL CALCULATOR.

SPECIFICATION forming part of Letters Patent No. 469,579, dated February 23, 1892.

Application filed April 28, 1891. Serial No. 390,835. (No model.)

*To all whom it may concern:*

Be it known that I, THEODORE MADER, of Corpus Christi, in the county of Nueces and State of Texas, have invented an Improved Mechanical Calculator, of which the following is a specification.

My invention is an improvement in that class of mechanical calculators which consist, broadly stated, of a fixed right-angular arm inscribed with a scale, a movable arm pivoted to one end of such fixed arm, and a third scale-bearing bar or arm, which is arranged at a right angle to and slides on one limb of the fixed arm. By adjusting the pivoted arm and the sliding arm certain calculations can be made.

In my invention the sliding bar or arm is arranged and held at an angle of about sixty degrees instead of ninety degrees, and various other differences of construction and arrangement exist, besides a corresponding difference in the scales, whereby I provide an instrument adapted to solve all proportions, not only such as relate to ordinary business, but geometric problems—such as areas, triangles, grades, latitude, and departure, &c.—whereby the instrument is adapted for use of surveyors and civil engineers.

In the accompanying drawings, Figure 1 is a plan view of my improved instrument. Fig. 2 is an enlarged section on line 2 2 of Fig. 1. Fig. 3 is an enlarged cross-section on line 3 3 of Fig. 1. Figs. 4 to 7, inclusive, are diagrammatic views illustrating the practical use of the instrument.

The fixed bar or arm A is inscribed on its face side with a number of scales. An arc bar $a$ is rigidly attached to its lower end and braced at the outer end by a bar $b$, that connects with the upper end of the fixed bar A. A movable bar B is pivoted to the top of the latter, and its free lower end moves over the arc bar $a$ and may be clamped to it at any desired point by means of a nut and screw $c$. The sliding scale-bar C is attached to a head or block D, which slides on the outer side of the fixed bar A, the two being suitably tongued and grooved together, Fig. 2, yet adapted to be readily detached. This sliding scale-bar C is arranged and maintained at an angle of sixty degrees with the fixed bar A. A vernier E is attached to the block D, parallel to the scales inscribed longitudinally on the fixed bar A and serves the usual function of subdividing the said scales for indicating fractional divisions of measurement or value. The lower end of the vernier E has a horizontal arm, whose upper edge $e$ serves as a line to read the scales on the fixed bar A.

The sliding bar C is in practice inscribed with a scale from 0 to 140; but in this instance the scale is shown extending to 110 only. The scale $x$ on bar A is for general use and is shown divided into one hundred parts or spaces, which are marked in regular numerical succession from the top downward. The next adjacent scale $y$ is for calculating lumber. The numbers on the same indicate the length of lumber in feet, the width in inches required to make one thousand feet being corresponding or opposite on scale $x$.

The sliding arm C requires to be adjusted at the outset to secure the required exact registration with the scales on the fixed bar A and the pivoted bar B. To this end it is constructed and connected with the block D, as shown in Fig. 2—that is to say, it has a portion that fits and slides in a recess in said block—and the two parts are secured together by means of a nut F and a screw F', that passes through block D and a lengthwise slot F in the bar C. A micrometer-screw G is so applied as to adapt it for use in effecting the longitudinal adjustment of the bar C.

The following examples will illustrate the manner of using the instrument with the scales shown:

MULTIPLICATION.

*Problem.*—If one yard of calico costs four and one-half cents, what will sixty-two yards cost? In other words, what is the product of sixty-two multiplied by four and one-half? Set the arm $e$ of the vernier E to 100 on the scale $x$ of the bar A, (see Fig. 4,) and also set the pivoted bar B so that its inner side or edge cuts 45 (4½) on the scale C. (See Fig. 1.) Then move arm $e$ to 62 on A, (see dotted lines, Fig. 1,) and the answer "$2.79" will appear on the scale of bar C, where the inner edge of the movable bar B intersects the bar C.

*Problem.*—If a bushel of wheat (weight sixty pounds) costs eighty-four cents, how much will nine hundred and ten pounds cost? Move the arm e to 60 on scale x (see Fig. 6) and set pivoted arm B to 84 on scale of sliding arm C. Move the arm e to 91 (910) on scale x, and the answer "12.74" will appear on the scale of the bar C at its intersection with the movable bar B.

*Problem.*—To solve the proportion 6 : 80 : : 40 : X, move the arm e to 60 on scale x. Move the pivoted bar B to 80 on scale of sliding bar C. Then move the arm e to 40 on scale x, and the answer "533.3" will appear on scale of bar C.

*Problem.*—Suppose it be required to sheath the sides of a building to cover a space seventy-two feet long and sixteen feet high. If sixteen-foot lumber is thirty-two dollars a thousand feet, what is the cost of a quantity measuring seventy-two feet in width? Move the arm e to 16 (see Fig. 7) in lumber-scale and set the pivoted arm B to 32 on the sliding arm C. Then move the arm e to 72 on scale y of A, and the answer "36.86" will be indicated on the sliding arm C.

I employ in practice various other scales than those herein shown and described. Among these I apply an interest-scale to the bar A, also a telemeter-scale, and others for use in reckoning latitude and distance, and correspondingly I apply other scales to the sliding bar C for reckoning latitude and departure, latitude and distance, distance and departure, and distance and latitude.

What I claim is—

1. The improved mechanical calculator consisting of the fixed bar having one or more scales on its face, the movable bar pivoted to the former, and the scale-bar C, sliding on the fixed bar and arranged and adapted to maintain an angle of sixty degrees to the same and having a scale corresponding to that or those on the fixed bar, as shown and described.

2. In a mechanical calculator of the class hereinbefore specified, the combination of the fixed scale-bar A, the pivoted scale-bar B, the block sliding on the fixed bar, and the sliding scale-bar C, secured to said block and arranged at an angle of sixty degrees to said fixed bar, the bar C being adjustably attached to the block, and a screw for adjusting the sliding bar, as shown and described.

THEODORE MADER.

Witnesses:
JOHN T. PARKER,
JOHN L. GEORGE.